2,828,237

Patented Mar. 25, 1958

2,828,237

SEALING POLYETHYLENE TO OTHER ORGANIC RESINS

Charles M. Rosser, Wallingford, Pa., assignor to American Viscose Corporation, Philadelphia, Pa., a corporation of Delaware No Drawing. Application September 8, 1955
Serial No. 533,245

16 Claims. (Cl. 154—139)

This invention relates to the heat sealing of polyethylene surfaces to the surfaces formed by other organic resins, and in particular to other vinyl resins.

Sheet materials having surfaces comprising thermoplastic vinyl resins of closely similar chemical nature join or coalesce readily in response to heating at a temperature closely above or below the softening points of the matter constituting respective surfaces to be brought together; such heating is ordinarily accompanied by pressure for urging the surfaces together. For example, surfaces comprising polymers or copolymers which differ only in the degree of polymerization are readily heat-sealed together. Also, sheets comprising copolymers which are constituted primarily of the same monomers join readily, especially when the softening temperatures of the copolymers are close. Apparently, because of considerable differences between the closely packed symmetric molecular configuration of polyethylene and the difference in molecular packing of the other vinyl resins, polyethylene is incompatible with, for example, the Sarans and the vinyl chloride copolymers, to the extent that it will not form joints of any substantial strength with these vinyl resins in the absence of an anchoring material.

It is a primary object of the present invention to firmly adhere articles, such as sheets, of which at least the surfaces comprise polyethylene to sheets or other articles constituted of, or coated with, other organic polymeric resins. An object ancillary to the foregoing object is to provide more flexibility in the use of combinations of wrapping materials comprising different resins or different resinous coatings. Other objects, features, and advantages will become apparent in the following description of the invention.

Briefly stated, the invention concerns the joining of articles comprising two incompatible resins, by treating the resinous surfaces to be joined with a polyalkylenimine, then pressing the sheets together with the resinous surfaces joined at a temperature close to the softening temperature of one of the resins. In a preferred embodiment, a flat surface of a polyethylene article is joined to a mating surface of a resin from the group comprising Sarans, vinyl chloride polymers and copolymers thereof with other vinyl monomers, polyesters such as polyethylene terephthalate, and the polyamides.

The polyalkylenimine may be applied to one or both of the surfaces to be joined. Satisfactory bonding of the resinous surfaces is obtained by treating merely one of the surfaces, preferably the polyethylene surface, which may be done by spraying, dipping, or brushing techniques. A very practical method is to apply the solution of the polyalkylenimine by passing the sheet having the polyethylene surface under a wick which may be mounted for movement into and out of contact with the sheet, synchronized with the movement thereof to moisten only designated portions of the sheet.

Where rapid evaporation of the solvent of the polyalkylenimine is desired, alcoholic solutions thereof may be employed. Where there is some opportunity for evaporation of the solvent aqueous solutions may be used. Although effective bonding of polyethylene with other resins is obtained in accordance with the method herein taught with solutions having as low as 0.01 percent of the polyalkylenimine, the time required for effecting fusion is excessive at this concentration for a commercial process. Much shorter activation periods may be achieved by using concentrations greater than about 0.025 percent. Concentrations of about 0.25 percent provide maximum effectiveness from the standpoint of operating a commercial process since they allow minimum activation periods at minimum activation temperatures. Greater concentrations than 0.25 percent are equally as effective but are not substantially more beneficial.

Extensive experimentation in forming polyethylene-to-Saran joints indicates that a substantial activation of polyethylenimine takes place when a polyethylene material treated with polyethylenimine is maintained under pressure in engagement with the surface of another organic resin such as polyvinyl chloride or Saran at a temperature of at least 100° C. Substantial adhesion does not appear to be obtainable below about 100° C. However, above this temperature, the strength of the joints is dependent upon sufficient time of activation, i. e., the period for heating the material forming the joint. For the resins, such as polyethylene terephthalate or nylon, the minimum activation temperature may be higher. For example, a Mylar-(a polyethylene terephthalate film)-to-polyethylene film joint requires heating at 150° C. to obtain good strength.

In extensive observations made with respect to uniting polyvinyl chloride film of 2 mils thickness to polyethylene film of approximately the same thickness, substantially maximum joint strength could be reached in an activation period of one-half second as long as adequate temperature is provided, i. e., temperatures not appreciably under 100° C.

Of the polyalkylenimines, polyethylenimine is presently preferred because of its availability in commercial quantities. However, such polyalkylenimines as polymers of propylenimine, butylenimine, propylethylenimine, benzylethylenimine, and others comprising the recurring ethylenimine groups of a polymer molecule which characterize effective bonding agents of this invention may be used. It is necessary that these imine polymers have a substantial degree of polymerization. According to experiments to date, polymers having a degree of polymerization below about 50 are not fully satisfactory for purposes of this invention and the polyalkylenimines function more effectively as adhesion or anchoring media as the degree of polymerization is increased. For example, an ethylenimine polymer which has a calculated molecular weight of about 315 (a 1 percent aqueous solution thereof has a specific viscosity of 0.12 at 25° C.) does not have adequate strength for bonding to incompatible resins as described herein, whereas an ethylenimine polymer having a specific viscosity under like conditions of 0.25 has a molecular weight approaching 4500 (calculated) and is such an effective bonding agent that in such cases where sufficient time and temperature has been employed to achieve a maximum activation of the anchoring agent, one or the other films will tear in attempting to separate the joint thereof. Commercially prepared polyethylenimines found satisfactory are Polymin P manufactured by the Badische Aniline Corp. (Germany) and polyethylenimine having a degree of polymerization of about 82, a calculated molecular weight of about 3200, and a specific viscosity (1 percent solution at 25° C.) of 0.23 manufactured by the Monomer Polymer Corp. (U. S.). The molecular weights of polyethylenimines herein indicated as calculated were obtained by the method described in the "Journal of Organic Chemistry," vol. 9, pages 141–146 (1944).

Although ideal conditions can not presently be set forth with respect to all aspects in practicing the invention, the examples hereinbelow will indicate satisfactory conditions and ranges for forming joints of thin, flexible polyethylene-surfaced materials with various other synthetic resins. In the examples below, the polyvinyl chloride film used is manufactured by the Celuton Company and identified as plasticized VBA 9924. This film is designated in the examples as PVC. The Saran film used in the examples below was manufactured by the Dow Chemical Company and identified as 200 gauge plasticized grade 517. Polyethylene is abbreviated in the examples as PE. The polyethylenimine used was Polymin P and is abbreviated as PEI. In the table below, the first column identifies the materials used to form a joint of each test piece. The second column "Time" contains the periods of time during which heating was applied at the temperature reported in the third column "Temperature." The last column reports the number of grams tension required to break the test piece. In some of the examples, regenerated cellulose film was coated with the resins named therein and in such cases the base film is indicated by the abbreviation RCF. The joints provided by the coated films are considered equivalent, from the standpoint of measuring the strength of the joint, as if the films had been constituted entirely of the resins constituting the coatings.

In all cases the test pieces in each example were separated from the platens by pieces of 300 gauge cellophane to enable the resinous or resin-coated test pieces to be readily separated from the sealing machine. The pressure of the platens on the test pieces was approximately 28 pounds per square inch. The test pieces were 2 inches wide and the area of the seals extended the full width of the test pieces and about one-half inch in the direction of the length of the pieces.

| Materials Joined | Time in Seconds | Temperature, °C. | Strength in grams |
|---|---|---|---|
| PVC Film to PVC | 5 | 130 | 2,100 |
| PVC Film to PE Film | 5 | 195 | 0 |
| PVC Film to *PE Film, plus PEI | 5 | 195 | 750 |
| PVC Film to PE Coated RCF | 5 | 130 | 0 |
| PVC Film to PE Coated RCF, plus PEI | 5 | 130 | 130 |
| PVC Film to PE Coated RCF, plus PEI | 5 | 130 | 750 |
| Saran Film to PE Film | 2 | 130 | 0 |
| Saran Film to *Saran Film | 2 | 130 | 2,400 |
| PE Film to PE Film | 2 | 130 | 2,400 |
| PE Film to Saran Film, PEI on PE | 2 | 130 | 100 |
| PE Fim to Saran Film, PEI on both | 5 | 130 | 350 |
| Mylar Film to Mylar | 5 | 195 | 0 |
| Mylar Film to Mylar PEI, plus PEI | 5 | 195 | trace |
| Mylar Film to PE Film | 5 | 195 | 0 |
| Mylar Film to PE Film, plus PEI | 5 | 150 | 1,150 |
| Mylar Film to PE Film, plus PEI | 5 | 170 | 1,000 |
| Mylar Film to *PE Film, plus PEI | 5 | 195 | 1,200 |
| Mylar to PE Coated RCF | 5 | 130 | 0 |
| Mylar to PE Coated RCF, plus PEI | 5 | 130 | trace |
| Nylon to PE Coated RCF | 5 | 130 | 10–20 |
| Nylon to PE Coated RCF, plus PEI | 5 | 130 | 250 |
| Nylon to PE Film, plus PEI | 5 | 130 | 600 |
| Nylon to PE Film, plus PEI | 5 | 150 | 950 |

* Material tore outside the joint.

In the manufacturing of many items of composite construction of which components may be advantageously fabricated of different polymeric resins, polyethylene parts may be joined to parts comprising other organic resins which will not weld or adhere thereto without the presence of an anchoring agent. The joining of a polyethylene surface with, for example, a Saran surface is particularly advantageous in forming heat sealable wrappers fabricated from film comprising a cellophane base, a coating on one side of polyethylene, and a coating on the other side of Saran. Though cellophane is a nonthermoplastic material, the seal is readily effected between the overlapping surfaces of polyethylene and Saran. The invention has been described with respect to thin gauge sheet materials which require only simple conduction heating as a part of the process herein taught, but the invention is readily applicable to materials of heavier construction which may be heated to actuate the alkylenimine at the interface of the different resins by equipment such as infrared or dielectric heating apparatus.

Various changes and modifications may be made in practicing the invention without departing from the spirit and scope thereof and, therefore, the invention is not to be limited except as defined in the appended claims.

I claim:

1. A joint comprising a polyethylene member, a member in bonded relation therewith comprising an organic polymeric resin, and a polyalkylenimine at the interface of the polyethylene and said resin.

2. A joint comprising a polyethylene member, a member in bonded relation therewith comprising an organic polymeric resin from the group consisting of Sarans, vinyl chloride polymers and copolymers thereof with other vinyl monomers, polyesters, and polyamides, and a polyalkylenimine at the interface of the polyethylene and said resin.

3. A joint as defined in claim 2 wherein the polyalkylenimine is polyethylenimine.

4. An article comprising joined member portions, one of said member portions comprising polyethylene and another portion comprising an organic polymeric resin in bonded relation with said polyethylene, and a polyalkylenimine at the interface of the polyethylene and said resin.

5. An article as defined in claim 4 wherein the resin is one from the group consisting of Sarans, vinyl chloride polymers and copolymers thereof with other vinyl monomers, polyesters, and polyamides.

6. An article as defined in claim 4 wherein the member portions comprise regenerated cellulose film, the film of one portion being coated with polyethylene and the film of the other portion being coated with said resin.

7. An article comprising a non-thermoplastic film coated on one side with polyethylene and on the other side with an organic polymeric resin from the group consisting of Sarans, vinyl chloride polymers and copolymers thereof with other vinyl monomers, polyesters, and polyamides, said coated film being disposed to place a polyethylene coated portion in contact with a resin coated portion, and polyethylenimine permeating the interface of the engaging surfaces of the polyethylene and the resin.

8. An article comprising a polyethylene member, a member in bonded relation therewith comprising a resin from the group consisting of Sarans, vinyl chloride polymers and copolymers thereof with other vinyl monomers, polyesters, and polyamides, and polyethylenimine having a degree of polymerization of at least 50 permeating the interface of said resin.

9. In a method of joining a thin flexible member comprising polyethylene forming a surface thereof to another member comprising an organic polymeric resin forming a surface to be joined with said first-named surface, the steps comprising applying a solution of polyalkylenimine to one of said surfaces, after the solvent of the polyalkylenimine has evaporated bringing the surfaces together under pressure applied to the members, and simultaneously heating the members sufficiently to activate the polyalkylenimine as a bonding agent for said surfaces.

10. A method as defined in claim 9 wherein said solution is aqueous.

11. A method as defined in claim 9 wherein said solution is alcoholic.

12. A method as defined in claim 9 wherein the concentration of the solution is within the range of 0.01 to 0.5 percent and a solution is applied to one of said surfaces to be joined in sufficient quantity as to continuously wet said surface at the instant of application.

13. A method as defined in claim 9 wherein in the step of heating the members, said surfaces are brought to a temperature above approximately 100° C.

14. A method as defined in claim 13 wherein in the step of heating the members said surfaces are brought to a temperature within the range of 100° C. to 200° C.

15. A method as defined in claim 9 wherein the members are heated to obtain a temperature of said surfaces of at least 100° C. for a period of at least one-half second.

16. A method of forming a wrapper which comprises a regenerated cellulose film coated on one side with polyethylene and on the other side with a resin from the group consisting of Sarans, vinyl chloride polymers and copolymers thereof with other vinyl monomers, polyesters, and polyamides, the steps comprising disposing the film around a goods receiving region with marginal portions of the film placed with the coating of one side in engagement with the coating of the other side, treating at least one of said coatings with a solution of a polyalkylenimine before said film shaping step, applying heat and pressure to said overlapping film portions to activate the polyalkylenimine and bring about bonding of said overlapping film portions.

References Cited in the file of this patent

UNITED STATES PATENTS

| Re. 24,062 | Horton | Sept. 20, 1955 |
| 2,622,056 | De Coudres et al. | Dec. 16, 1952 |
| 2,656,297 | Davis et al. | Oct. 20, 1953 |